United States Patent
Diederiks et al.

(10) Patent No.: US 7,369,903 B2
(45) Date of Patent: May 6, 2008

(54) METHOD OF AND SYSTEM FOR CONTROLLING AN AMBIENT LIGHT AND LIGHTING UNIT

(75) Inventors: Elmo Marcus Attila Diederiks, Eindhoven (NL); Erwin Rinaldo Meinders, Eindhoven (NL); Edwin Van Lier, Eindhoven (NL); Ralph Hubert Peters, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 378 days.

(21) Appl. No.: 10/519,059

(22) PCT Filed: Jun. 20, 2003

(86) PCT No.: PCT/IB03/02958

§ 371 (c)(1),
(2), (4) Date: Dec. 22, 2004

(87) PCT Pub. No.: WO2004/006578

PCT Pub. Date: Jan. 15, 2004

(65) Prior Publication Data

US 2006/0058925 A1   Mar. 16, 2006

(30) Foreign Application Priority Data

Jul. 4, 2002   (EP) .................. 02077686

(51) Int. Cl.
*G05B 13/02* (2006.01)
*G01J 1/32* (2006.01)

(52) U.S. Cl. ........................ 700/28; 250/205

(58) Field of Classification Search ................. 700/28, 700/32, 52; 165/254; 250/205, 214 AL
See application file for complete search history.

(56) References Cited

U.S. PATENT DOCUMENTS

| | | | |
|---|---|---|---|
| 5,061,997 A | | 10/1991 | Rea et al. |
| 5,406,176 A | * | 4/1995 | Sugden .................. 315/292 |
| 5,461,188 A | * | 10/1995 | Drago et al. ............ 84/600 |
| 5,542,000 A | | 7/1996 | Semba |
| 5,818,342 A | * | 10/1998 | Solomon et al. ....... 340/815.46 |
| 5,986,201 A | * | 11/1999 | Starr et al. .............. 84/645 |
| 6,151,529 A | * | 11/2000 | Batko ..................... 700/28 |
| 6,555,966 B2 | * | 4/2003 | Pitigoi-Aron ............ 315/158 |
| 6,564,108 B1 | * | 5/2003 | Makar et al. ............ 700/17 |
| 6,614,013 B2 | * | 9/2003 | Pitigoi-Aron et al. .... 250/205 |

(Continued)

FOREIGN PATENT DOCUMENTS

DE   2703845   11/1978

(Continued)

OTHER PUBLICATIONS

Adamson K et al: True Multimedia Presentations: A Case Study, vol. 17, No. 3-4, May 1997, pp. 131-141.

(Continued)

*Primary Examiner*—Thomas K Pham

(57) ABSTRACT

The invention relates to the on-line analysis of meta-data that is received together with a video signal. This analysis results in an adaptation of the lighting surrounding the presentation device (110). One or more characteristics of the meta-data are filtered out and translated into lighting settings of one or more light elements (102, 104, 106, 108), which in turn can contain one or more light sources.

9 Claims, 2 Drawing Sheets

U.S. PATENT DOCUMENTS

| | | | |
|---|---|---|---|
| 6,617,560 B2 * | 9/2003 | Forke | 250/205 |
| 6,640,142 B1 * | 10/2003 | Wong et al. | 700/28 |
| 6,933,486 B2 * | 8/2005 | Pitigoi-Aron et al. | 250/205 |
| 2002/0154773 A1 | 10/2002 | Long et al. | |

FOREIGN PATENT DOCUMENTS

| | | |
|---|---|---|
| DE | 19710307 A1 | 9/1998 |
| DE | 19756705 A1 | 6/1999 |
| DE | 29901005 U1 | 8/1999 |
| EP | 0264053 | 4/1988 |
| EP | 0264053 A2 | 4/1988 |
| EP | 0264053 B1 | 4/1988 |
| JP | 2001021194 A | 1/2001 |
| WO | WO9416374 A1 | 7/1994 |
| WO | WO02068777 A | 9/2002 |

OTHER PUBLICATIONS

M. Nebenfuhr, et al: An Occupant Dependent, Self-Optimizing Home-Automation System Using Neuro-Fuzzy Control, ICSC/IFAC, 1998, pp. 816-819.

* cited by examiner

METHOD OF AND SYSTEM FOR CONTROLLING AN AMBIENT LIGHT AND LIGHTING UNIT

The invention relates to a method of controlling an ambient light, the method comprising: receiving main data and additional data by a receiver; setting a property of the ambient light based upon the additional data.

The invention further relates to a system of controlling an ambient light, the system comprising: receiving means conceived to receive main data and additional data; setting means conceived to set a property of the ambient light based upon the additional data.

The invention further relates to a lighting unit comprising a light armature and such a system.

An embodiment of such a method and system is described in EP 0 264 053. Here, an audio and television receiver is described that receives together with a radio or television signal an additional signal. This additional signal can for example be a Radio Data System (RDS) signal or a Video Programm System (VPS) as used in Germany. The additional signal can be used to switch on a light, change the brightness or change the color of the light, turn off a doorbell or a telephone to prevent to be disturbed while watching a movie, etc. The additional signal can also be used, for example, to mark a start and end of a television program. Then, upon receipt of the additional signal, a video recorder will start recording the program at the start of the television program and will end recording at the end of the program. Thus the additional signal is used to switch devices on and off while a radio or a television signal is being received.

It is an object of the invention to provide a method according to the preamble with an enhanced functionality by means of such additional data. To achieve this object the method is characterized in that the additional data comprises descriptive information about the main data and the method comprises filtering this descriptive information from the additional data and setting the property of the ambient light based upon the descriptive information.

By providing descriptive data about main data, such as a television show, a movie, a game, music, etc. together with the main data, the ambient light enhances the experience of the main data. For example, when a horror movie is being watched, the ambient light can become less bright. Furthermore, the ambient light can comprise different colors and the usage of a color or combination of colors can also depend upon the descriptive data that comprises descriptive information about the main data. For example, when relaxing music is being listened to, a combination of colors can be used that has a relaxing effect onto the human body. In the case of the horror movie, dark colors like black, brown and red can be used.

An embodiment of the method according to the invention is described in claim 2. By presenting the main data by a presentation device and setting the property of the ambient light that is in proximity of the presentation device, the ambient light enhances the experience of the presented main data more. The experience can be enhanced by, for example aligning the used colors of the ambient light with the average color used within the presented main data. The ambient light can, for example, also be aligned with the distribution of the used colors within the presented main data.

An embodiment of the method according to the invention is described in claim 3. By setting the property of the ambient light substantially synchronously with presenting the main data by the presentation device, the ambient light enhances the experience of the presented main data more.

For example, in the case of the horror movie, the lights can become more dimmed when the tension within the movie increases and can become brighter again when the tension within the movie decreases again. The used colors of the ambient light can also change according to the changing content of the main data. For example, when commercials are shown during a movie, the ambient light can be turned to normal, white light conditions.

An embodiment of the method according to the invention is described in claim 4. By making the setting of the property of the ambient light configurable, it is possible to overrule the default behavior of the ambient light. For example, when an ambient light does only support a limited number of colors, the supported colors can be configured.

An embodiment of the method according to the invention is described in claim 5. By making the setting the property of the ambient light configurable by a user preference, it is possible to overrule the default behavior of the ambient light further. For example, when a user does not desire red ambient light, bright ambient light or a hectic light effect etc., the user can configure this preference.

It is an object of the invention to provide a system according to the preamble that reacts upon the actual content of a media signal in an improved way. To achieve this object the system is characterized in that the additional data comprises descriptive information about the main data and the system comprises filtering means conceived to filter this descriptive information from the additional data and the setting means are conceived to set the property of the ambient light based upon the descriptive information.

Embodiments of the system according to the invention are described in claims 5 and 6. These and other aspects of the invention will be apparent from and elucidated with reference to the embodiments described hereinafter as illustrated by the following Figures:

Today, the experience we have while consuming media content at home is enhanced by means of bigger screens, image enhancement and more incredible sound. Examples of these are wide screen television, 100 Hz. Digital scan image enhancement, Dolby Surround Sound, Philips Incredible Sound etc. Moreover, film and Television show producers also try to influence the experience of their audience by all kinds of visual and audible effects, such as color, scene cuts, etc.

Figure 1:
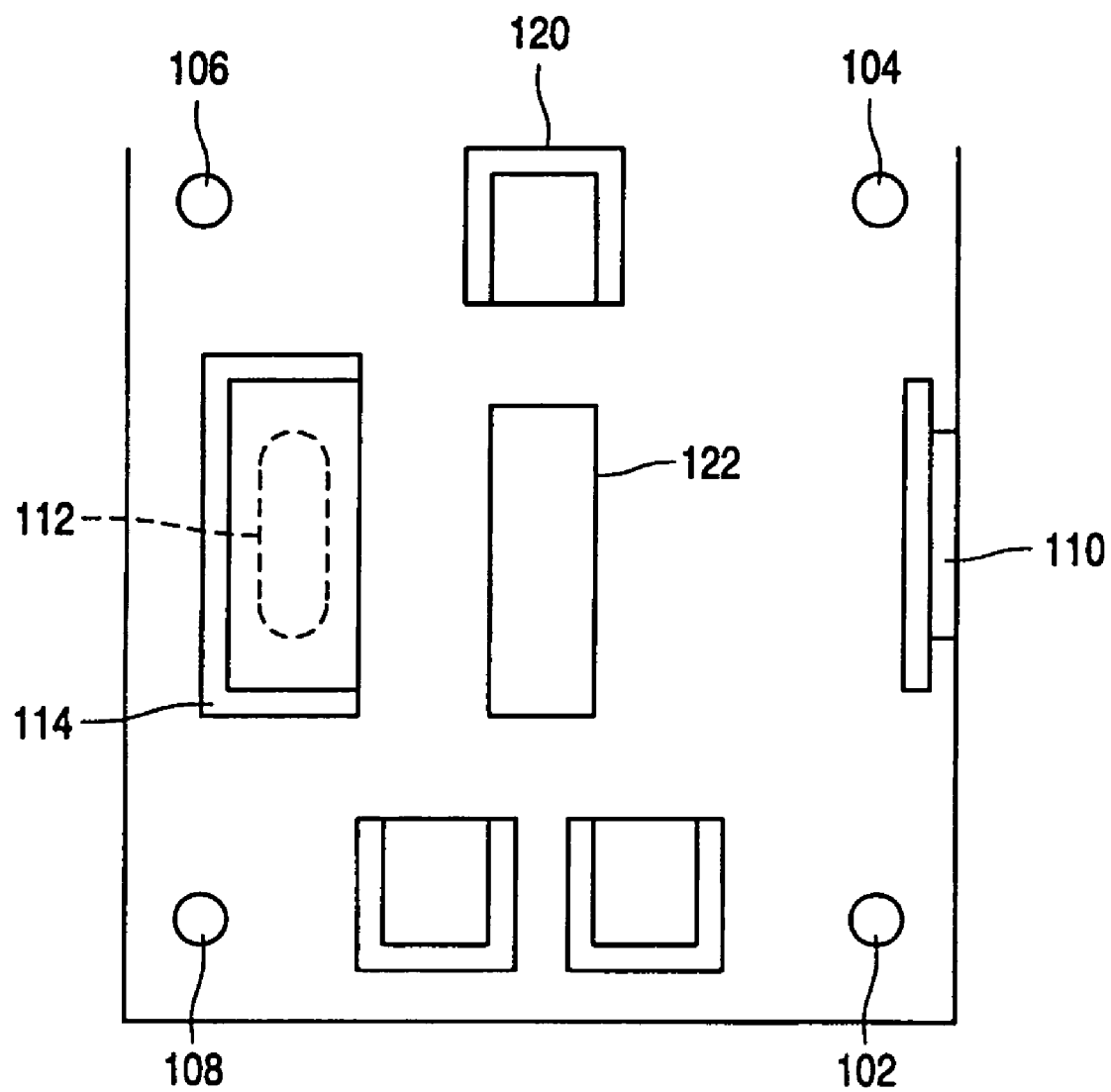
FIG. 1 illustrates an embodiment of an ambient light environment.

FIG. 1 illustrates an embodiment of an ambient light environment. Here, 100 illustrates a living room in which light elements, 102, 104, 106, 108, and 112 are positioned. The light elements can comprise LED illumination cells of different colors like red, green and blue. Other colors and other light emitting resources, like conventional light can also be used. The light element 112 is positioned underneath the couch 114. The television 110 receives and processes a television signal and the processed television is shown on its screen. The television 110 can be an analogue television signal receiver or a digital television signal receiver. The television signal can be received via a satellite dish, cable, storage device, internet etc. Furthermore, the television signal can in general be a video signal or an image as can be stored upon a VCR, CD, DVD, a Game machine a PC etc. The living room 100 contains also other furniture like chairs 116, 118, and 120 and a table 122. The positions of the furniture and the shown furniture is only meant as an example to illustrate the invention that allows realization and change of both ambiance and light effect in combination with video, games, audio, etc. For example, when a person has invited his friends over to watch a DVD, the light enhances the experience they have while watching the DVD. In this case, a Science Fiction movie is watched and an ambient dark-purple glow amplifies the spooky atmosphere of the first scenes. Within the movie, a thunderstorm starts and the ambient light flashes synchronous with the thunderstorm lights within the movie. While the thunderstorm rolls away, a green pulsating light from beneath the couch starts to indicate that the aliens are near the characters within the movie.

Figure 2:
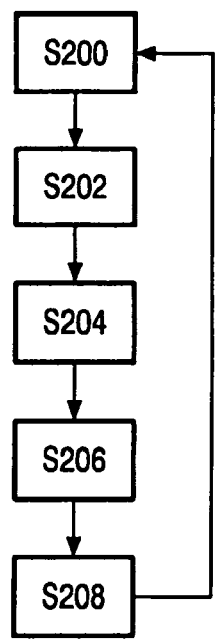
FIG. 2 illustrates the main steps of an embodiment of the method according to the invention.

FIG. 2 illustrates the main steps of an embodiment of the method according to the invention. Within step S200, by means of example, a television signal is received together with meta-data that describes the content of the received television signal. In the case of an analogue television signal, the meta-data can for example be received as teletext information or be received within image lines that are not shown like the first and last image line. In the case that a digital television signal is received, the meta-data can for example be described as a MPEG-4 object or be described using XML, HTML or any other language that can be used for the purpose of sending meta-data with the television signal as is preferably defined within the Digital Video Broadcast (DVB); Multi Media Home Platform Specification 1.0 (DVB/MHP specification). The current version of the DVB/MHP specification is available from http://www.etsi.org with reference to number ETSI TS 101 812 V1.1.1. It is further possible to use the information present within an Electronic Program Guide (EPG) or in the case of an internet enabled device, that the meta-data is received concurrently with the received video signal. The meta-data is distinguished from the television signal and the meta-data is further processed within the next step S202.

Within step S202, the meta-data is analysed. The meta-data can be analysed at various positions in the route of the video signal being presented to the user: inside the output device, for example a television set; or using a dedicated device on a scart that is running between a television set and a DVD player. Within the analysis special tags are searched for that can be used to set the ambient light. For example, tags that describe if the light element should be switched on or off; tags that describe the hue, saturation, intensity, brightness, focus, diffuseness, direction, etc. of the light element. It is also possible that generic tags, like for example genre information used within an EPG is used and translated into light element settings. The tags can also describe for example, the average color of a movie over a longer period of time, thereby setting the ambient light to reflect this average color. The ambient light can than react in more detail to the actual color of a specific screen location. For example, setting a green ambiance light in the surroundings of the displaying device in the case that a documentation about the rain forest is presented or to an ambient light that reflects a setting sun and extends the colors of the setting sun across the living room. Optionally, these light element settings can be fine-tuned within the next steps.

Within step S204, the configuration of the ambient light environment is taken into account to determine the light element settings. The configuration can comprise for example, the position of the light elements, the available colors, the available orientations of the light elements, etc. The position of the light elements can be used to determine the position of the light elements with respect to the display device 110. The light elements that are very close to the display device 110, should not be so bright to prevent that the displayed images cannot be viewed properly anymore. Whereas light elements that are too far away from the display device 110 should not be used, since their luminance does not contribute to the ambient light. The position can also be used for example to determine the light elements that should be involved in controlling a desired lighting effect. The configuration information can further be used to determine the different intensities and colors of the different light elements in order to achieve an optimal effect of the combined light sources. For example, in the case of a specific program, like a health program or sports program that is being shown on the display device, a combination of colors can be used that influences health and mood like:

| | |
|---|---|
| good morning: | R 99% + G 99% + B 99% |
| relax: | R 20% + G 50% + B 80% |
| energy: | R 99% + G 40% + B 0% |
| working: | R 60% + G 50% + B 50% |
| idea: | R 40% + G 60% + B 0% |
| balance: | R 40% + G 0% + B 99% |
| relation: | R 40% + G 99% + B 50% |
| play: | R 99% + G 0% + B 99% |
| love: | R 99% + G 0% + B 0% |
| dream: | R 0% + G 0% + B 99% | in which R stands for Red, G stands for Green and B stands for Blue. Another example is configuring the sensitivity for changes in the content. Many scene cuts might result in a hectic lighting effect. By lowering the sensitivity, the system only reacts to more major changes over a longer period of time. For example, in the case that a DVD or VCR movie is viewed, fast forwarding the scenes transits the lighting into a neutral light setting. Yet another example is configuring the balance, which in the case of multiple light sources would shift the lighting more to a specific light source. Also polarization and scene contrast are examples, where polarization reflects the ability of the system to enhance the ambiance more or less for predefined events, like emphasizing a goal of a favorite soccer club more than a goal of the non-favorite soccer club. And scene contrast reflects the ability of the system to change the ambient light in succeeding scenes, etc.

Within the next step S206, other preferences of light settings like user preferences are taken into account. These preferences can be used to effect the intensity of the amplification by the lighting effect of the mood and ambiance of the content. The preferences can intensify or weaken the lighting effect, for example to make a scary movie appear less frightening. The user preferences can also be used to determine if a user has already seen a movie. For example, the ambient light effects can intensify each time a user has watched a movie. Furthermore, the user preferences can be used to determine the desired lighting effects, like for example when a user does not want a thunderstorm to be emphasized, the lighting effects for a thunderstorm can be omitted.

Within the final step S208, the light settings are transmitted to the different light elements while synchronously the television signal is displayed by the display device. Generally, together with displaying the television signal, audio is played as well. Preferably, the lighting effect is synchronized both with the displayed television signal and the audio signal. Because the audio signal can be played with surround effects, as is generally known, the lighting effect is further preferably synchronized with the audio in terms of both space and time. For instance, a sound explosion behind the viewer at the right hand side, should be supported by a light effect emitted by the light elements that are positioned at the right hand side too. If only the audio is used to set the ambient light, the meta-data can be sent as a generally known RDS signal.

With the described method amongst others, a following effect can be achieved: consider a science fiction movie in which an alien ship cast a shadow over a city. This is enhanced by extending this movement with ambient light. If the ship starts behind the viewer, the two light elements in the back dim first. Subsequently the sub light and the light elements in the front dim and finally the ship can be soon moving over the city on the television screen. If the ship starts in the screen and moves forward over the viewer, the two light elements in the front dim first, and subsequently the sub light and the light elements in the back dim. Finally the frontal light elements, the sub light and the back light elements brighten again so that it seems that the ship continues flying.

The order in the described embodiments of the method of the current invention is not mandatory, a person skilled in the art may change the order of steps or perform steps concurrently using threading models, multi-processor systems or multiple processes without departing from the concept as intended by the current invention.

Figure 3:
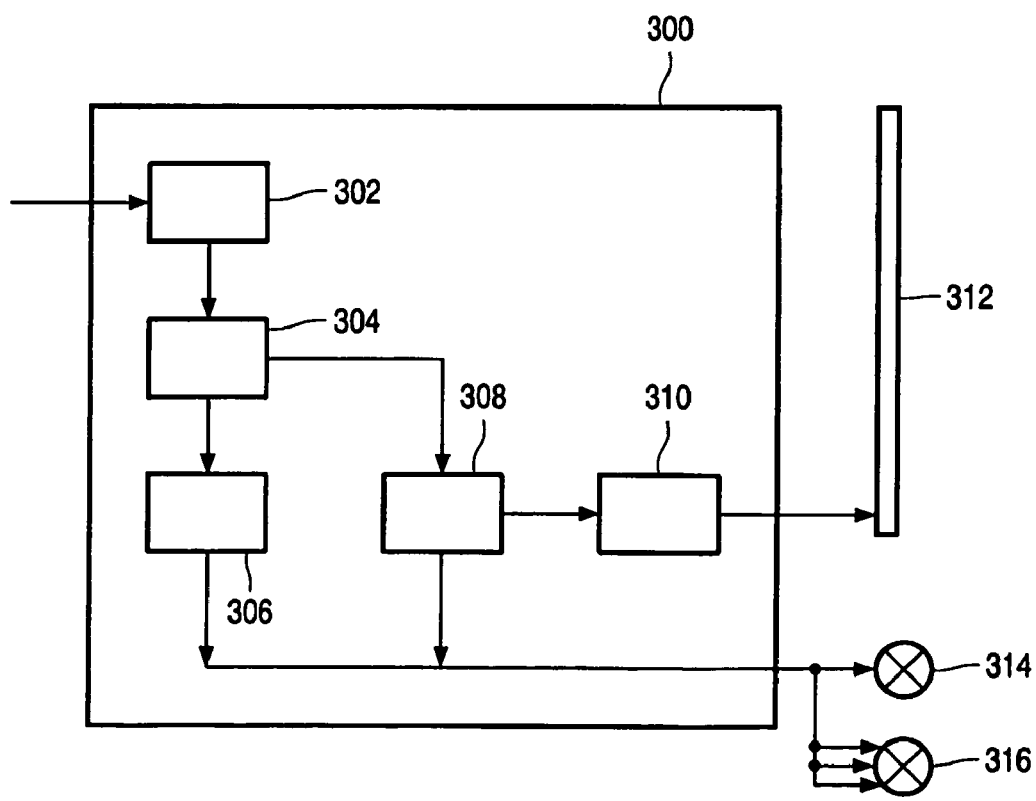
FIG. 3 illustrates an embodiment of the system according to the invention in a schematic way.

FIG. 3 illustrates an embodiment of the system according to the invention in a schematic way. The system 300 comprises memories 302, 304, 306, 308, and 310. Memory 302 comprises computer readable code designed to decode a digital video signal like an MPEG signal. Memory 304 comprise computer readable code designed to split the video signal from the meta-data. Memory 306 comprises computer readable code designed to set the light settings of the light elements 314 and 316. Light element 314 comprises one halogen light source and light element 316 is a LED light and comprises three light sources: Red, Green and Blue. Memory 308 comprises computer readable code designed to synchronize the received video signal with the light settings. Memory 310 comprises computer readable code designed to translate the video signal into a displayable signal like RGB for the display 312, like a CRT. The memories can communicate with each other through a software bus while using the processing power of a central processing unit, both of which are not shown. The system is described by means of example as a software system. However, dedicated hardware or combinations of software with hardware, like programmable hardware that is designed to perform the mentioned method steps is included too. Furthermore, a digital video signal is used as an example, while an analogue video signal can be used too. In the latter case the meta-data can amongst others be sent as a teletext signal that can be splitted from the video signal in a convential way.

It should be noted that the above-mentioned embodiments illustrate rather than limit the invention, and that those skilled in the art will be able to design many alternative embodiments without departing from the scope of the appended claims. For example, extending the lighting with more, specific purpose, light sources and offering algorithms to harmonize the output of these sources, like using a floodlight to enlighten a wall for the purpose of ambiance creation, spots that are positioned on various locations for the purpose of lighting effects in specific locations in the room, or a sub light positioned under a couch. In the claims, any reference signs placed between parentheses shall not be construed as limiting the claim. The word "comprising" does not exclude the presence of elements or steps other than those listed in a claim. The word "a" or "an" preceding a element does not exclude the presence of a plurality of such elements. The invention can be implemented by means of hardware comprising several distinct elements, and by means of a suitably programmed computer. In the system claims enumerating several means, several of these means can be embodied by one and the same item of computer readable software or hardware. The mere fact that certain measures are recited in mutually different dependent claims does not indicate that a combination of these measures cannot be used to advantage.

The invention claimed is:

1. Method of controlling an ambient light, the method comprising:
   receiving main program data and additional data by a receiver;
   setting a property of the ambient light based upon the additional data;
   including descriptive information about the main program data in the additional data;
   filtering the descriptive information from the additional data;
   setting a sensitivity of the ambient light to the main program data; and
   setting the property of the ambient light based upon the descriptive information and the sensitivity to enhance perception of the main program data, wherein a lower sensitivity results in less changes to the property of the ambient light over time than a higher sensitivity for the main program data.

2. Method of controlling an ambient light according to claim 1, the method comprising presenting the main program data by a presentation device and setting the property of the ambient light that is in proximity of the presentation device.

3. Method of controlling an ambient light according to claim 2, wherein setting the property of the ambient light is substantially synchronously with presenting the main program data by the presentation device.

4. Method of controlling an ambient light according to claim 1, wherein setting the property of the ambient light is configurable.

5. Method of controlling an ambient light according to claim 1, wherein setting the property of the ambient light is configurable by a user preference.

6. System of controlling an ambient light, the system comprising:
   receiving means to receive main program data and additional data;
   setting means to set a property of the ambient light based upon the additional data,
   characterized in that:
   the additional data comprises descriptive information about the main program data and the system comprises:
   filtering means to filter this descriptive information from the additional data; and
   setting means to set the property of the ambient light based upon the descriptive information and a sensitivity to enhance perception of the main program data, wherein a lower sensitivity results in less changes to the property of the ambient light over time than a higher sensitivity for the main program data.

7. System of controlling an ambient light according to claim 6, the system comprising presenting means to present the main program data on a presentation device and setting means to set the property of the ambient light that is in proximity of the presentation device.

8. System of controlling an ambient light according to claim 7, the system comprising synchronization means to synchronize the presenting means with the setting means.

9. Lighting unit comprising a light armature and the system according to claim 6.

* * * * *